(12) United States Patent
Shahidzadeh et al.

(10) Patent No.: US 7,557,725 B2
(45) Date of Patent: Jul. 7, 2009

(54) EVENT SIGNATURE APPARATUS, SYSTEMS, AND METHODS

(75) Inventors: Shahrokh Shahidzadeh, Beaverton, OR (US); Jonathan P. Douglas, Portland, OR (US); Anil V. Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 10/676,178

(22) Filed: Sep. 30, 2003

(65) Prior Publication Data

US 2005/0068187 A1 Mar. 31, 2005

(51) Int. Cl.
*G08B 21/00* (2006.01)

(52) U.S. Cl. .................. 340/653; 340/635; 340/654; 340/657; 340/662

(58) Field of Classification Search ........... 340/635, 340/657–664; 324/759, 500, 523, 537, 755, 324/765, 771
See application file for complete search history.

(56) References Cited

U.S. PATENT DOCUMENTS

| | | | | |
|---|---|---|---|---|
| 3,789,242 A | * | 1/1974 | Cantor ..................... 327/74 |
| 4,845,632 A | | 7/1989 | Kroll et al. |
| 4,980,791 A | * | 12/1990 | Alberkrack et al. ........... 361/90 |
| 5,680,353 A | * | 10/1997 | Gaultier et al. ............. 365/200 |
| 5,781,391 A | * | 7/1998 | Ide et al. .................... 361/91.5 |
| 5,796,256 A | * | 8/1998 | Fowler et al. ............... 324/456 |
| 5,805,091 A | * | 9/1998 | Sherry et al. ................ 341/120 |
| 5,867,809 A | * | 2/1999 | Soga et al. .................. 702/130 |
| 5,898,634 A | * | 4/1999 | Chevallier ................... 365/226 |
| 5,995,011 A | * | 11/1999 | Kurihara et al. ............. 340/663 |
| 6,044,476 A | | 3/2000 | Ote et al. |
| 6,246,332 B1 | * | 6/2001 | Hubbard .................... 340/658 |
| 6,360,177 B1 | * | 3/2002 | Curt et al. ..................... 702/64 |
| 6,445,523 B2 | * | 9/2002 | Thomas et al. ............... 360/48 |
| 6,600,425 B1 | * | 7/2003 | Parsadayan ................. 340/660 |
| 6,694,282 B2 | * | 2/2004 | Perner ........................ 702/130 |
| 6,891,214 B2 | * | 5/2005 | Mori et al. .................. 257/298 |
| 6,985,002 B2 | * | 1/2006 | Salcedo ...................... 324/765 |
| 2001/0047216 A1 | * | 11/2001 | Ando ......................... 700/109 |
| 2002/0021225 A1 | * | 2/2002 | Sanzo ........................ 340/660 |
| 2004/0150928 A1 | * | 8/2004 | Goodfellow et al. .......... 361/90 |
| 2004/0246016 A1 | * | 12/2004 | Salcedo ...................... 324/765 |

* cited by examiner

*Primary Examiner*—Benjamin C Lee
*Assistant Examiner*—Son M Tang
(74) *Attorney, Agent, or Firm*—Blakely, Sokoloff, Taylor & Zafman LLP

(57) ABSTRACT

An apparatus and a system, as well as a method and article, may operate to compare a circuit operational condition with a specified condition, to record an out-of-specification condition, and to determine some specified number of recorded out-of-specification conditions.

24 Claims, 5 Drawing Sheets

EVENT SIGNATURE APPARATUS, SYSTEMS, AND METHODS

TECHNICAL FIELD

Various embodiments described herein relate generally to the operation of circuitry, including apparatus, systems, and methods capable of detecting and/or recording the operation of circuitry outside of specified limits.

BACKGROUND INFORMATION

Electronic circuitry, including processors, can sometimes be forced to operate outside of specified conditions, such as at higher voltages, and higher frequencies, than those recommended by the manufacturer. Unfortunately, such activity may affect the reliability and longevity of the affected components. Determining the existence of specific conditions indicating operation outside of specified limits may result in reducing the time and cost required for component repair and/or replacement.

DETAILED DESCRIPTION

Several of the terms used in this document are defined as follows: Indelible Memory is a memory having content that cannot be erased after being stored therein (e.g., one or more fuses, or any type of read-only memory). Processor includes a microprocessor, a state machine, a digital signal processor, an embedded processor, a chip set, and any other type of circuit capable of executing one or more programmed instructions.

Various embodiments may operate to dynamically detect and permanently record the operation of various components, including microprocessors, as signatures of events occurring outside of tested or recommended use conditions. For example, in some embodiments, this might be accomplished using a digital-to-analog converter (DAC) to provide a programmed, specified operating voltage for a component to compare with the actual component operating voltage. A voltage comparator may then feed the result of the comparison to error logic that captures a signature each time over-voltage operation occurs, perhaps by programming a programmable read-only-memory (PROM) fuse. An associated software program (e.g., a basic input-output system (BIOS)) may read the resulting signatures during each power-on cycle for the component. After determining that some selected number of attempts to operate the component above the specified voltage level have occurred, an indication of the out-of-specification operation may be provided (e.g., an interrupt). The captured, permanent signatures may also be made available, possibly using machine-specific registers, for failure analysis upon return of the component to the manufacturer.

It should be noted that while out-of-specification operational conditions may indeed comprise over-voltage conditions, other conditions may also be detected and recorded. Thus, specified operational conditions that can be detected, monitored, and stored include voltage levels, current levels, signal timing and/or clock speeds, signal ramp (e.g., edge) shape and/or speed, relationships between signals (e.g., voltages, currents, timing, logic protocols), temperature, and any other conditions that may be specified in association with the operation of an associated circuit. Therefore, the reader should keep in mind that while voltage conditions are discussed generally herein, this is for the purpose of clearly explaining the operation of various embodiments, and any other operational conditions may be used in place of, or in addition to, voltage conditions.

Figure 1:
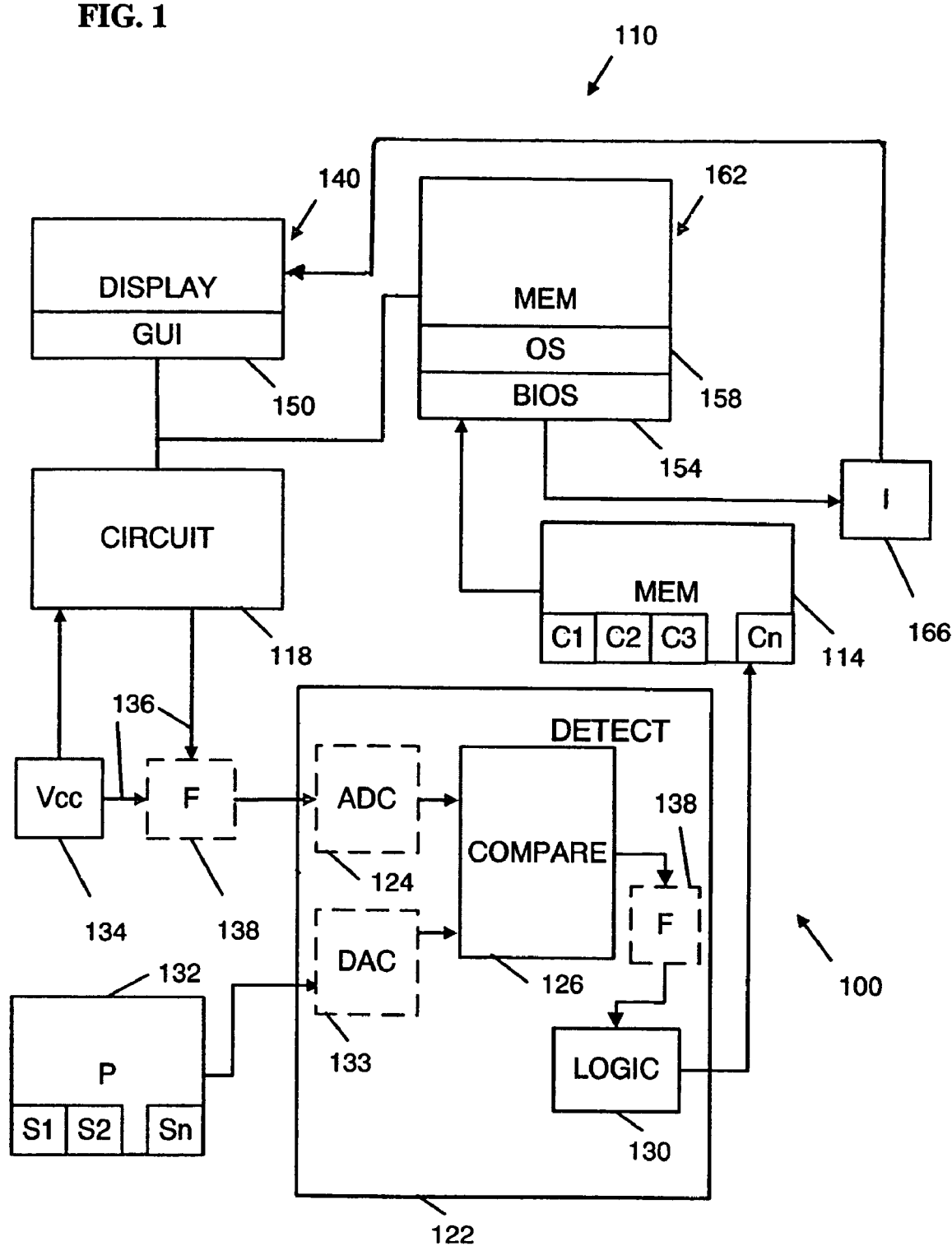
FIG. 1 is a block diagram of apparatus and systems according to various embodiments.

FIG. 1 is a block diagram of an apparatus 100 and a system 110 according to various embodiments. For example, the apparatus 100 may comprise a memory 114, such as an indelible memory (which may comprise one or more fuses), to store some selected number of out-of-specification operational conditions C1, C2, C3, . . . Cn encountered by an electronic circuit 118, including any type of processor.

The apparatus 100 may also include a detection module 122 coupled to the memory 114 to determine the existence of at least one of the selected number of out-of-specification operational conditions C1, C2, C3, . . . Cn. The detection module 122, in turn, may include one or more logic modules, such as an optional analog-to-digital converter (ADC) 124 (depending on the type of condition or event being monitored, e.g., analog or digital), and/or a comparator 126, and/or error logic 130 to detect the existence of one, some, or all of the out-of-specification operational conditions C1, C2, C3, . . . Cn.

For example, an operational voltage Vcc may be applied to the ADC 124, and a digital output code from the ADC 124 may be compared to a programmed value S1 supplied by a memory 132, such as a reference memory, to store one or more specified conditions S1, S2, . . . , Sn to be compared with corresponding operational conditions associated with the monitored electronic circuit 118. As is the case for the ADC 124 then, an optional DAC 133 may be coupled to the memory 132 and the comparator 126, depending on the type of event or value S1 (e.g., digital or analog) to be supplied for comparison. The end result may be, for example, that if the voltage Vcc provided by a power supply 134 to the circuit 118 is greater than the specified voltage S1, then the resulting out-of-specification operational condition C1 may be stored in the memory 114.

The stored condition C1 may be a single bit to indicate that the specification value S1 was exceeded, multiple bits to indicate the relative amount by which Vcc exceeds S1, and/or some digitized version of the actual value of Vcc. The comparator 126 may be an analog comparator or a digital comparator, or some combination of these. Of course, those of skill in the art will realize after reading this disclosure that other specified conditions and comparisons (e.g., relative to data stored in the memory 132) can be made as appropriate to the type of circuit 118 and the operational conditions 136 to be detected and recorded.

During the power-on sequence for the circuit 118, the actual input voltage (e.g., Vcc provided by the power supply 134) or other operational condition 136 applied to the monitored circuit 118 may vary somewhat erratically for a short time as current begins to flow. Thus, the apparatus 100 may also comprise optional filter modules 138 coupled to the detection module 122 and/or included in the detection module 122, in order to smooth out the detected voltage Vcc (and/or other operational conditions 136, and/or the results of comparisons). The filter modules 138 may operate to filter a voltage or current, or simply act to delay the time before the operational condition 136 (e.g., applied voltage Vcc) is compared with the specified condition (e.g., programmed or specified voltage S1). The filter modules 138 may also operate to filter spurious events or conditions, as well as noise associated with events to be recorded.

In some embodiments, a system 110 may include the apparatus 100, as well as a display 140 coupled to the electronic circuit 118. The display 140 may be used to display a graphical user interface 150, which may in turn be used to display an out-of-specification condition.

The system 110 may also include a memory 132 to store one or more of the specified conditions S1, S2, . . . , Sn to be compared with corresponding operational conditions associated with the monitored electronic circuit 118, which may be an integrated circuit. For example, the specified conditions S1, S2, . . . , Sn may comprise a recommended operational voltage upper limit associated with the circuit 118. The system 110 may also include one or more associated software programs, such as a BIOS 154 and an operating system 158, perhaps stored in a memory 162 coupled to the circuit 118. The BIOS 154 may be used to determine the selected number of out-of-specification operational conditions (e.g., when three out-of-specification operational conditions C1, C2, and C3 are detected and recorded, the BIOS 154 may indicate this occurrence by using an interrupt 166, which may in turn prompt the display of a graphical indication of an out-of-specification condition on the display 140).

Figure 2:
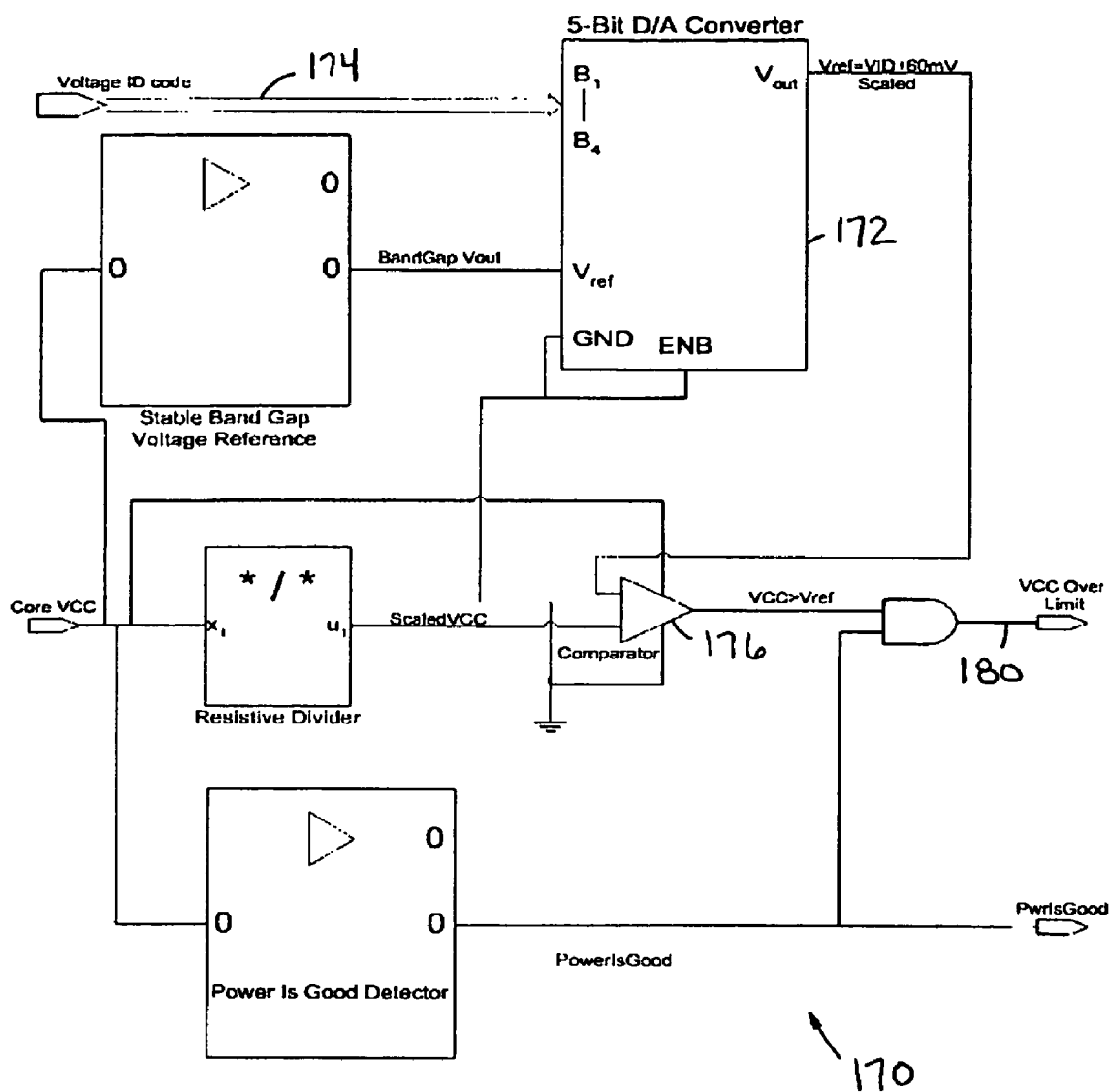
FIG. 2 is a circuit block diagram of an over-voltage detector according to various embodiments.
Figure 3:
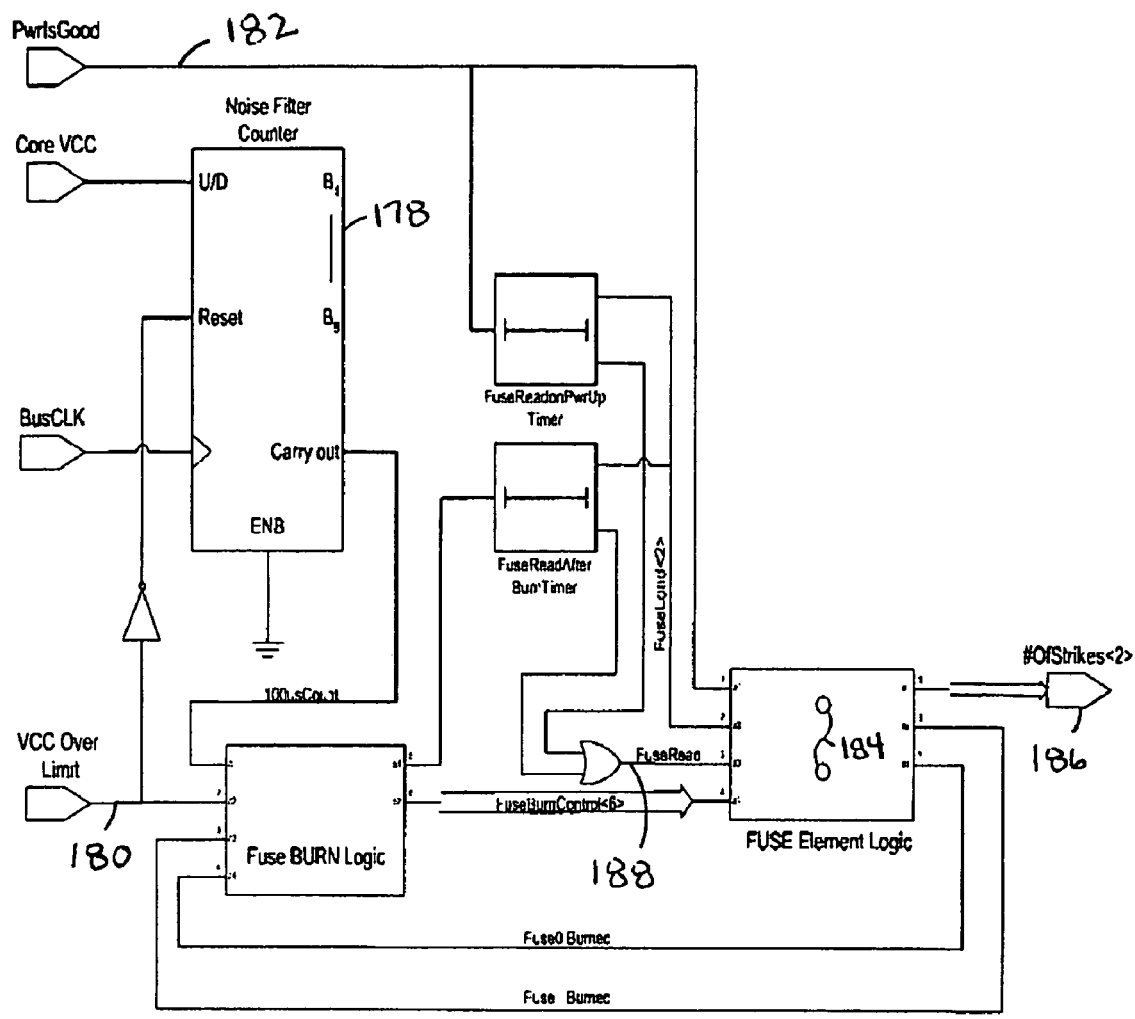
FIG. 3 is a circuit block diagram of filtering and fuse logic according to various embodiments.

Several embodiments may be realized using various types of circuit components. For example, FIG. 2 is a circuit block diagram of an over-voltage detector (OVD) 170 according to various embodiments. FIG. 3 is a circuit block diagram of filtering and fuse logic according to various embodiments. The OVD 170 may include a DAC 172 to read a fused and encoded Programmed Operating Voltage (POV) 174 to provide an analog output to a comparator 176. The comparator 176 output may then be processed for acceptance by a Noise Filter Counter (NFC) 178 in the form of a Vcc Over Limit (VccOL) signal 180 at some time after power (e.g., Vcc) is applied to the monitored circuit (not shown). The VccOL signal 180 may be enabled by the PowerIsGood signal 182 (indicating the monitored circuit or device is operating functionally) to program a PROM/fuse bit 184. An Over Voltage Signature (OVS) 186 may comprise some combination of the operational condition (e.g., the input voltage Vcc), the PROM/fuse output 188 and the PowerIsGood signal 182 to indicate the selected number of times a circuit is subjected to out-of-specification operational conditions (e.g., over-voltage). A software mechanism, such as a BIOS or operating system can read the signature 186 and report the signature 186 (perhaps via interrupt) when the selected number has been reached, which may indicate the circuit, such as a processor, is being overstressed. The display 140 may be used to display the out-of-specification condition. Poly-fuse elements may be used to store the signatures 186. Other types of indelible memory may also be used.

The apparatus 100, system 110, memory 114, electronic circuit 118, detection module 122, ADC 124, comparator 126, error logic 130, memory 132, DACs 133, 172, power supply 134, operational conditions 136, filter modules 138, display 140, graphical user interface 150, BIOS 154, operating system 158, memory 162, interrupt 166, OVD 170, POV 174, comparator 176, NFC 178, VccOL signal 180, PowerIsGood signal 182, PROM/fuse bit 184, OVS 186, and PROM/fuse output 188 may all be characterized as "modules" herein.

Such modules may include hardware circuitry, and/or one or more processors and/or memory circuits, software program modules, including objects and collections of objects, and/or firmware, and combinations thereof, as desired by the architect of the apparatus 100 and the system 110, and as appropriate for particular implementations of various embodiments.

It should also be understood that the apparatus and systems of various embodiments can be used in applications other than for integrated circuits, including processors, and other than for systems that include displays and graphical user interfaces, and thus, various embodiments are not to be so limited. The illustrations of an apparatus 100 and a system 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 4:
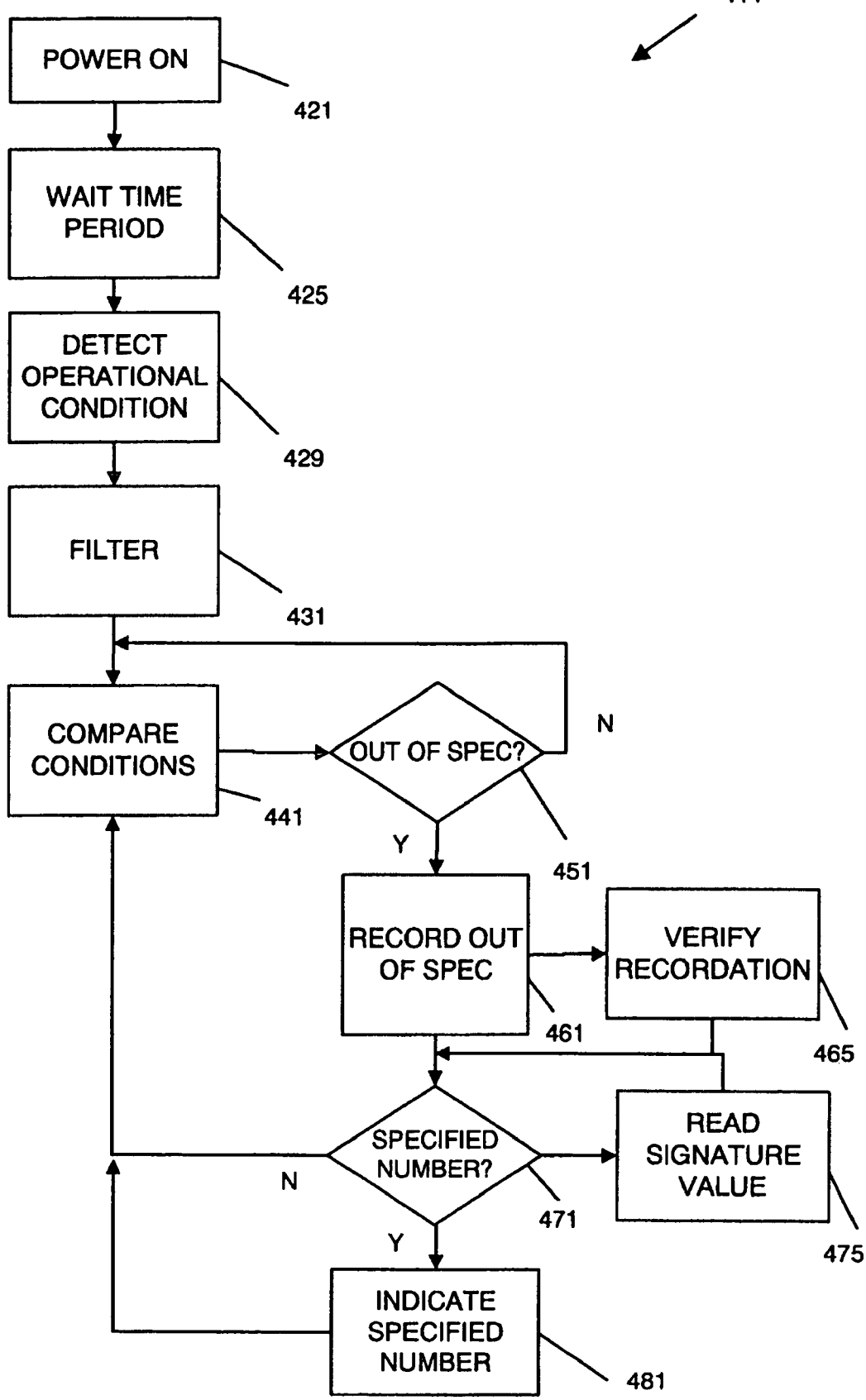
FIG. 4 is a flowchart diagram illustrating several methods according to various embodiments.

Many different embodiments may be realized. For example, FIG. 4 is a flowchart diagram illustrating several methods according to various embodiments. A method 411 may (optionally) begin with applying power to a circuit or component associated with various specified conditions, including various recommended operational conditions, such as upper voltage limits, or clocking frequency limits, at block 421. The method 411 may continue with waiting for some time period at block 425 prior to detecting one or more operational conditions, such as detecting an out-of-specification condition as an over-voltage condition (perhaps associated with an integrated circuit) at block 429. Thus, the method 411 may include refraining from detecting the out-of-specification condition for a specified amount of time at block 425. The specified amount of time may include a duration of one or more clock periods, and/or be associated with a power-on reset time. The method 411 may also include filtering one or more of the detected operational conditions at block 431. Such filtering may also be conducted for a duration of one or more clock periods.

At block 441, the method 411 may include comparing one or more operational conditions with one or more corresponding specified conditions. If one of the operational conditions is determined to be out-of-specification at block 451, then the method 411 may continue with recording the out-of-specification condition at block 461, and verifying recordation at block 465 (e.g., verifying that a face value is stable after burning). Recording the out-of-specification condition at block 461 may further comprise recording the out-of-specification condition in a non-volatile memory, such as an indelible memory. If operational conditions are within the specification, the method 411 may continue with further comparisons of operational and specified conditions at block 441.

The method 411 may continue after block 461 to block 471 by determining some specified number of recorded out-of-specification conditions. For example, it may be desired to determine whether some specific number of operational sessions for the circuit, during which out-of-specification conditions were encountered, has been reached. The number of occurrences can be determined by reading one or more signature values at block 475. Thus, determining the specified number of recorded out-of-specification conditions may further comprise reading one or more signature values stored in a non-volatile memory at block 475. If the selected number of occurrences has been reached, as determined at block 471, this situation may be indicated at block 481. In either case, the method 411 may continue with further comparisons of operational and specified conditions at block 441.

Thus, in an embodiment, the method 411 may include comparing an operational voltage with a specified voltage at block 441, recording an over-voltage condition at block 461, and determining a specified number of recorded over-voltage conditions at block 471. Recording the over-voltage condition at block 461 may further comprise recording the over-voltage condition only if the operational voltage is greater than the specified voltage by a selected amount, such as a selected number of millivolts. The selected amount may be based upon an allowed tolerance for one or more operating conditions, including a noise figure or noise voltage value, such as at least about two times greater than an expected noise voltage value. The method 411 may also include verifying recordation of the over-voltage condition at block 465.

In an embodiment, the method 411 may also comprise storing at least one over-voltage condition occurring in an integrated circuit in a non-volatile memory at block 461, determining a specified number of stored over-voltage conditions at block 471, and indicating the specified number of stored over-voltage conditions at block 481 (e.g., using an interrupt or machine-specific register).

It should be noted that the methods described herein do not have to be executed in the order described, or in any particular order. Moreover, various activities described with respect to the methods identified herein can be executed in serial or parallel fashion. Information, including parameters, commands, operands, conditions, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 5:
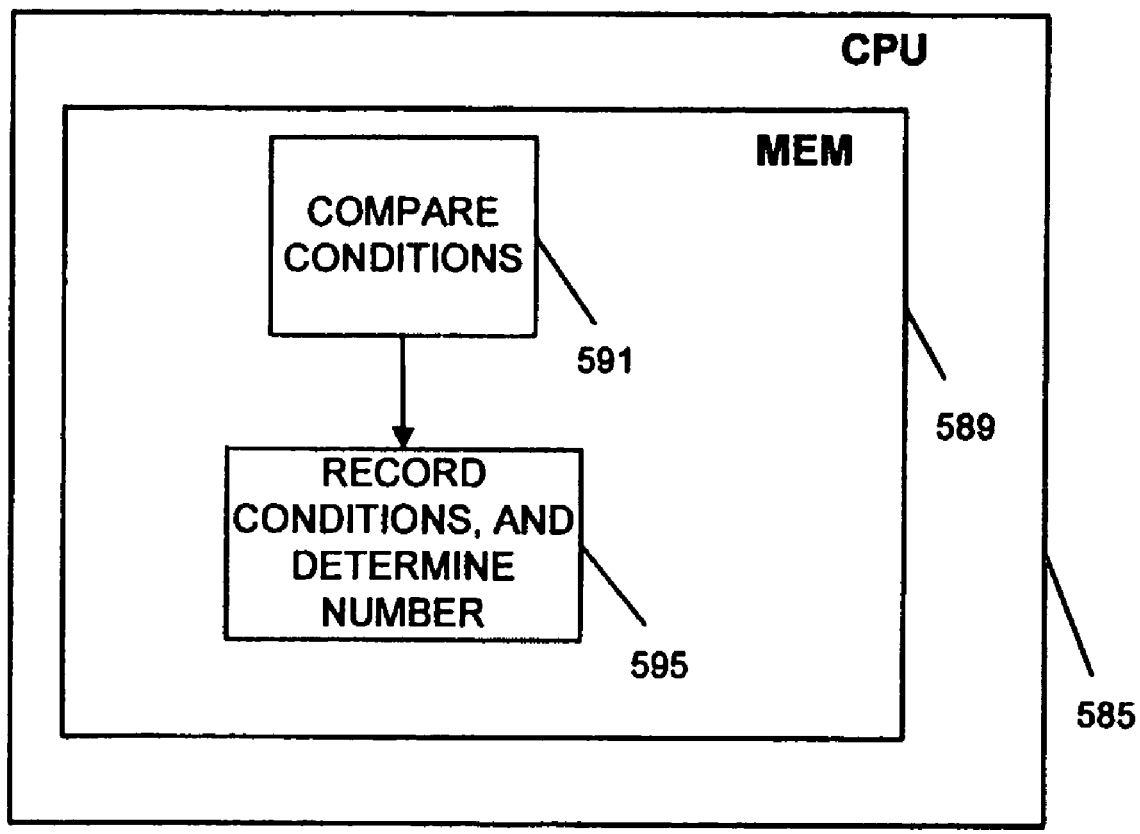
FIG. 5 is a block diagram of an article including a machine-accessible medium according to various embodiments.

FIG. 5 is a block diagram of an article 585 including a machine-accessible medium 589 according to various embodiments. Thus, it can now be seen that another embodiment may include an article 585 such as a computer, a memory system, a magnetic or optical disk, some other storage device, and/or any type of electronic device or system, comprising a machine-accessible medium such as a memory 589 (e.g., a memory including an electrical, optical, or electromagnetic conductor) having associated data 591, 595 (e.g., computer program instructions), which when accessed, results in a machine performing various actions. These actions may include comparing an operational voltage with a specified voltage, recording an over-voltage condition, and determining a specified number of recorded over-voltage conditions. Other activities may include filtering the operational voltage for at least a clock period duration, recording the over-voltage condition only if the operational voltage is greater than the specified voltage by a selected amount (e.g., at least about two times greater than an expected noise voltage value), and verifying recordation of the over-voltage condition.

Dynamically detecting and permanently recording events as signatures during the operation of various components, including microprocessors, outside of tested or recommended use conditions may facilitate failure analysis. Such activity, as enabled by various embodiments, may also assist in the prevention of fraud, and reduce the time and cost required for component repair and/or replacement.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:
1. A method, comprising:
 storing data corresponding to at least one input operating over-voltage condition occurring in an integrated circuit in an indelible memory; determining a specified number of stored over-voltage conditions; indicating the specified number of stored over-voltage conditions; refraining from detecting the over-voltage input operating con- dition for a specified amount of time, and wherein the specified amount of time is associated with a power-on reset time.

2. A method, comprising:
comparing an input operational condition of an electronic circuit with a specified condition:
recording data corresponding to an out-of-specification input operating condition in an indelible memory; and
determining a specified number of recorded out-of-specification input operating conditions indicating the specified number of said out-of-specification conditions;
refraining from detecting the out-of-specification input operating condition for a specified amount of time, and wherein the specified amount of time is associated with a power-on reset time.

3. The method of claim 2, further comprising:
detecting the out-of-specification input operating condition as an input operating over-voltage condition.

4. The method of claim 2, wherein the specified condition comprises a recommended operational input voltage upper limit associated with an integrated circuit.

5. The method of claim 2, wherein the indelible memory comprises at least one fuse.

6. The method of claim 2, wherein determining the specified number of recorded out-of-specification input operating conditions further comprises:
reading a signature value stored in the indelible memory.

7. An article comprising a machine-accessible medium having associated data, wherein the data, when accessed, results in a machine performing:
comparing an input operational voltage of an electronic circuit with a specified voltage;
recording a value corresponding to an input operating over-voltage condition in an indelible memory;
determining a specified number of recorded input operating over-voltage conditions; displaying said specified number of over-voltage conditions; and recording a clock speed at the time of occurrence of the over-voltage input operation condition.

8. The article of claim 7, wherein the data, when accessed, results in the machine performing:
filtering the input operational voltage for at least a duration of one clock period.

9. The article of claim 7, wherein recording the value corresponding to the input operating over-voltage condition further comprises:
recording the value corresponding to the input operating over-voltage condition only if the input operational voltage is greater than the specified voltage by a selected amount.

10. The article of claim 9, wherein the selected amount is at least about two times greater than an expected noise voltage value.

11. The article of claim 7, wherein the data, when accessed, results in the machine performing:
verifying recordation of the value corresponding to the input operating over-voltage condition.

12. An apparatus, comprising:
an indelible memory to store information corresponding to a selected number of out-of-specification input operational conditions encountered by an electronic circuit; a display for displaying said selected number of out-of-specification input operational conditions; and a filter for refraining from detecting the out-of-specification input operating condition for a specified amount of time, wherein the specified of time is associated with a power-on reset time.

13. The apparatus of claim 12, further comprising:
a detection module coupled to the indelible memory to determine the existence of at least one of the selected number of out-of-specification input operational conditions.

14. The apparatus of claim 13, further comprising:
a filter module coupled to the detection module.

15. The apparatus of claim 12, wherein the indelible memory comprises a fuse.

16. The apparatus of claim 12, wherein at least one of the out-of-specification input operational conditions comprises an over-voltage condition.

17. A system, comprising:
an indelible memory to store data corresponding to a selected number of out-of-specification input operational conditions and a clock speed occurrence at the time of said conditions encountered by an electronic circuit; and
a display coupled to the electronic circuit to indicate said selected number.

18. The system of claim 17, wherein the electronic circuit comprises a microprocessor.

19. The system of claim 17, further comprising:
a logic module to detect each one of the selected number of out-of-specification input operational conditions.

20. The system of claim 19, wherein the logic module comprises an analog-to-digital converter.

21. The system of claim 17, further comprising:
a second memory to store data corresponding to a specified condition to be compared with an operational condition associated with the electronic circuit.

22. The system of claim 21, wherein the specified condition comprises a recommended operational input voltage upper limit associated with an integrated circuit.

23. The system of claim 22, wherein the integrated circuit comprises a microprocessor.

24. The system of claim 17, further comprising:
a basic input-output system to determine the selected number of out-of-specification input operational conditions.

* * * * *